(12) United States Patent
Peeri

(10) Patent No.: US 9,429,757 B1
(45) Date of Patent: Aug. 30, 2016

(54) SYSTEM FOR PROVIDING PROJECTED INFORMATION COMBINED WITH OUTSIDE SCENERY

(71) Applicant: Jonathan Peeri, West Hills, CA (US)

(72) Inventor: Jonathan Peeri, West Hills, CA (US)

( * ) Notice: Subject to any disclaimer, the term of this patent is extended or adjusted under 35 U.S.C. 154(b) by 0 days.

(21) Appl. No.: 14/076,173

(22) Filed: Nov. 9, 2013

(51) Int. Cl.
*G02B 27/14* (2006.01)
*G02B 27/01* (2006.01)

(52) U.S. Cl.
CPC ................................ *G02B 27/0172* (2013.01)

(58) Field of Classification Search
None
See application file for complete search history.

(56) References Cited

U.S. PATENT DOCUMENTS

| | | | |
|---|---|---|---|
| 6,262,848 B1 | 7/2001 | Anderson | |
| 6,636,185 B1 | 10/2003 | Spitzer | |
| 6,744,478 B1 | 6/2004 | Asakura | |
| 6,952,312 B2 | 10/2005 | Weber | |
| 7,123,418 B2 | 10/2006 | Weber | |
| 7,777,960 B2 | 8/2010 | Freeman | |
| 8,339,710 B2 | 12/2012 | Torii | |
| 8,427,395 B2 | 4/2013 | Seder | |
| 2005/0041297 A1* | 2/2005 | He et al. | 359/631 |
| 2005/0180706 A1* | 8/2005 | Jones | G02B 6/0006 385/115 |
| 2011/0227487 A1* | 9/2011 | Nichol et al. | 315/158 |

* cited by examiner

Primary Examiner — Nicholas Lee
Assistant Examiner — Duane N Taylor, Jr.

(57) ABSTRACT

A system for producing a display image on a transparent, semi-transparent or translucent surface, without the need for an integral light source. The system includes a reflective surface that utilizes external light to project the display image in a selectable direction. A light collecting element collects and directs ambient light to the reflective surface. A display processor creates the display image and transmits the image onto an optical device. The optical device that has a reflective polarizer accepts the projected display image. The optical device selectively reflects light of the projected display image, and while controlling the optical properties of the light from second direction it combines the projected display image with the light from the second direction.

24 Claims, 5 Drawing Sheets

SYSTEM FOR PROVIDING PROJECTED INFORMATION COMBINED WITH OUTSIDE SCENERY

This application claims priority of Provisional Application No. 61/796,415 filed Nov. 10, 2012.

TECHNICAL FIELD

The invention generally pertains to projection systems, and more particularly to a system for producing a projected head-up display on a transparent or semi-transparent, stationary or a window type surface.

BACKGROUND ART

Imaging and projection systems are well known in the art. Examples of imaging and projecting systems include a head-up display (HUD) and window displays. These imaging and projecting systems produce a display image that is either natural or combined with an artificial image generated by an electronic system toward a person's eye. A head-up display is mounted on a platform or any type of mounting not attached to the viewer which is incapable of transparent viewing, meaning the display image is overlaid on the normally viewed scenery. The display image appears at a distance from the viewer, as if it is part of the normal scenery. The display image is typically bright and has a high contrast that can be distinguished from the normal scenery by use of a beam splitter. A beam splitter or optical combiner is an optical device (e.g., a semi-transparent mirror), which enables the superimposing, or combining of two images to one.

The prior art requires the use of a very powerful image source. An optical combiner is required in order to enhance the viewed image over the high surrounding ambient light during daytime. Usually special coatings, diachronic, holographic, narrow band selective or ND (neutral density) filters are also used.

During night time or in a dimmed environment, the image source needs to be capable of reducing its brightness considerably to avoid image blooming. In order to achieve a constant contrast ratio (CR, defined as the ratio between the brightness of a visual element and that of the surroundings), for any ambient light conditions, the Display Device (DD)'s brightness needs to be adjusted accordingly.

In prior art HUD optical systems the display device is typically a powerful CRT or LCD 10 with a strong backlight using light emitting source like LED. The amount of light such a display needs to reach is 6,000 to 10,000 FC (foot candles), depending on the combiner's reflection ratio. Coatings and filters may be used within some prior art optical systems. The minimum required contrast ratio (CR) that allows the viewer to see display image against bright environment is 1:1.2. A sub-image is provided by an emissive display device (DD) where it is generated by an electronic image generator.

The optical equation for the contrast ratio is:

$$CR = Bd * R\% / Bb$$

Where:
CR—Contrast Ratio 20
Bd—Display Brightness
R %—Reflection factor of the combiner
Bb—Background Brightness seen by the viewer, typically ambient light*(1−R %)

For best performance: the R % is higher as possible while the Bb is lower as required, the goal of the head up displays is to achieve a ratio of image brightness to ambient light as high as possible. A search of the prior art did not disclose any literature or patents that read directly on the claims of the instant invention. However, the following U.S. patents are considered related:

| Pat. No. | INVENTOR | ISSUED |
|---|---|---|
| 8,427,395 | Seder | 29 Apr. 2013 |
| 7,123,418 | Weber | 17 Oct. 2006 |
| 6,952,312 | Weber | 4 Oct. 2005 |
| 6,744,478 | Asakura | 1 Jun. 2004 |
| 2005/0041297 | He | 24 Feb. 2005 |

The U.S. Pat. No. 8,427,395, discloses a system that projects graphics upon a transparent windscreen head-up display of a vehicle. The system includes a graphics projection system projecting light upon the transparent windscreen head-up display and the transparent windscreen head-up display emits light in a limited field of view based upon the projected light.

The U.S. Pat. No. 7,123,418 discloses a head-up display that a projection system and a window having a target area where a reflective polarizer is positioned to reflect light from the projection system to a viewing area. Light from the projection system is p-polarized and strikes exposed window surface(s) at an acute angle to reduce or eliminate multiple or "ghost" images. The reflective polarizer includes a multilayer stack with refractive indices of individual layers chosen to reflect p-polarized light substantially more than s-polarized light over a narrow angular range.

The U.S. Pat. No. 6,952,312 discloses a head-up display that includes a projection system and a window having a target area where a reflective polarizer is positioned to reflect light from the projection system to a viewing area. Light from the projection system is p-polarized and strikes exposed window surface(s) at an acute angle to reduce or eliminate multiple or "ghost" images. The acute angle is closely matched to a Brewster angle of the exposed window surface(s).

The U.S. Pat. No. 6,744,478 discloses a head-up display system comprising a transparent plate. A liquid crystal display generates a display light of information with a plane of polarization included relative to an image plane vertical axis. A first optical rotation layer is disposed on a first surface of the transparent plate, and receives the display light from the liquid crystal display and optically rotates the plane of polarization of the display light. A second optical rotation layer is between the image plane of the liquid crystal display and a second surface of the transparent plate, and optically rotates the plane of polarization of the display light and allows S-polarized light to emanate toward the transparent plate at Brewster's angle.

The 2005/0041297 patent discloses basic helmet-mounted and head-up display systems with emitting image source like CRT or LED with the additional use of CLC-Based electrically controlled reflection surface. The display brightness to the viewer is electrically controlled by the combiner's reflective surface. However, at bright ambient light, when the viewer needs to have highest contrast ratio, the combiner provided in this patent will increase the combiner's reflection thus block most of the outside scenery for the viewer.

For background purposes and indicative of the art to which the invention relates, reference may be made to the following remaining patents found in the patent search.

| Pat. No. | INVENTOR | ISSUED |
|---|---|---|
| 8,339,710 | Torii | 25 Dec. 2012 |
| 7,777,960 | Freeman | 17 Aug. 2010 |
| 6,636,185 | Spitzer | 21 Oct. 2003 |
| 6,262,848 | Anderson | 17 Jul. 2001 |
| 2011/0227487 | Nichols | 22 Sep. 2011 |

DISCLOSURE OF THE INVENTION

Imaging systems display visual information, either natural or artificial (generated by an electronic system), toward the human eye. Head-up and window displays are types of imaging systems that display an image on a semi-transparent medium, such that the displayed image is combined on the scenery viewed through the transparent medium.

Current head-up and window display systems suffer from reduced image visibility in strong ambient light, and the need for powerful emitted light for generating an image. The instant improved imaging system provides enhanced visibility for systems such as head-up and window displays by operating under all light conditions. A further objective of the improvement is to provide cost and energy saving by utilizing ambient light in place of the emitted light image display technology currently in use, while keeping a binocular wide field of view and wide viewer head motion box.

One or more aspects of this improved imaging system is enhancing the viewer's situational awareness by displaying information, such as instrument data, real-time or non-real-time system status, etc., as part of the normal viewed scenery, while operating under all light conditions. The system can also provide cost and energy savings by utilizing ambient light as a light source in lieu of powerful emitted light as currently used by emissive displays.

In its most basic design, the instant system provides vehicle real-time status information, directional information, bibliographic information, an individual's personal information, historical information, multimedia information, and I-Phone/I-Pad related images and information.

The system enhances a user's safety as, in a vehicle application for example, a driver can see driving information and warnings while looking ahead and maintaining visibility of the road and traffic ahead.

The advantage of this invention over the prior art is that since the reflection occurs at the first layer of the inner side of the windshield or window, a higher efficiency of the combined image is achieve relative to the prior art. This higher efficiency is translated to a clear ghost-less image with high contrast ratio with a wide field of regard.

Another advantage is the wide angle of the projected combined image, the binocular field of view display and less sensitivity to the projection angle relative to the prior art, enabling more flexibility in aiming the combined image at the driver thus accommodating various viewers' heights.

The instant system is based on the principle of wire-grid polarizers that are easier to utilize and integrate relative to Brewster-based polarizers that require special and more stringent angles and thickness of the optical medium that they are using as a reflective surface.

A wire grid polarizer consists of an array of fine parallel metallic wires, placed in a plane perpendicular to the appropriate polarized incident beam. Electromagnetic waves, which have a component of electric fields aligned parallel to the wires, induce the movement of electrons along the length of the wires. Since the electrons are free to move in this direction, the polarizer behaves in a similar manner to the surface of a metal when reflecting light; and the wave is reflected backwards along the incident beam (minus a small amount of energy lost to joule heating of the wire).

When waves with electric fields perpendicular to the wires interface with the grid, the electronics cannot traverse the width of each wire; therefore, little energy is reflected, and the incident wave is able to pass through the grid. Since electric field components parallel to the wires are reflected, the transmitted wave has an electric field purely in the direction perpendicular to the wires, and is thus linearly polarized.

Another embodiment of the present invention is based on the principle of thin-film linear polarizers that are also easier to utilize and integrate relative to the Brewster-based polarizers that require special and more stringent angles and thickness of the optical medium that they are using as a reflective surface.

Thin-film linear polarizers are glass substrates on which a special optical coating is applied. Interference effects in the film cause them to act as beam-splitting polarizers. The substrate for the film can either be a plate, which is inserted into the beam at a particular angle, or a wedge of glass that is cemented to a second wedge to form a cube with the film cutting diagonally across the center.

Thin-film polarizers generally do not perform as well as Glan-type polarizers, but they are inexpensive and provide two beams that are about equally well polarized. The cube-type polarizers generally perform better than the plate polarizers. The former are easily confused with Glan-type bi-refringent polarizers.

In view of the above disclosure, the primary object of the invention is to produce an improved system for producing a display image on a transparent or semi-transparent surface that has the following characteristics:
  superior optical properties,
  supports verity of humans ergonomics (e.g. head movement, viewer height/position, IPD (Interpupillary Distance), Field of Regards,
  operates well when subject to high vibration and vehicle motion,
  inherent automatic contrast control (Adjustments)—ACC,
  eliminates the use of expensive and complex optical relay or high power optical elements as currently is used in prior art designs,
  is easy to use,
  provides enhanced visibility for the user,
  utilizes ambient light as a light source instead of powerful emitted light (which is currently used by many prior art designs),
  can be sold as a user-installed kit or an OEM product,
  significantly increases driver's safety, and
  is cost effective from both a manufacturer's and consumer's point of view.

These and other objects and advantages of the present invention will become apparent from the sub sequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of a system, as shown in FIGS. 1-5, for producing a display image on a transparent or semi-transparent surface.

Figure 3:
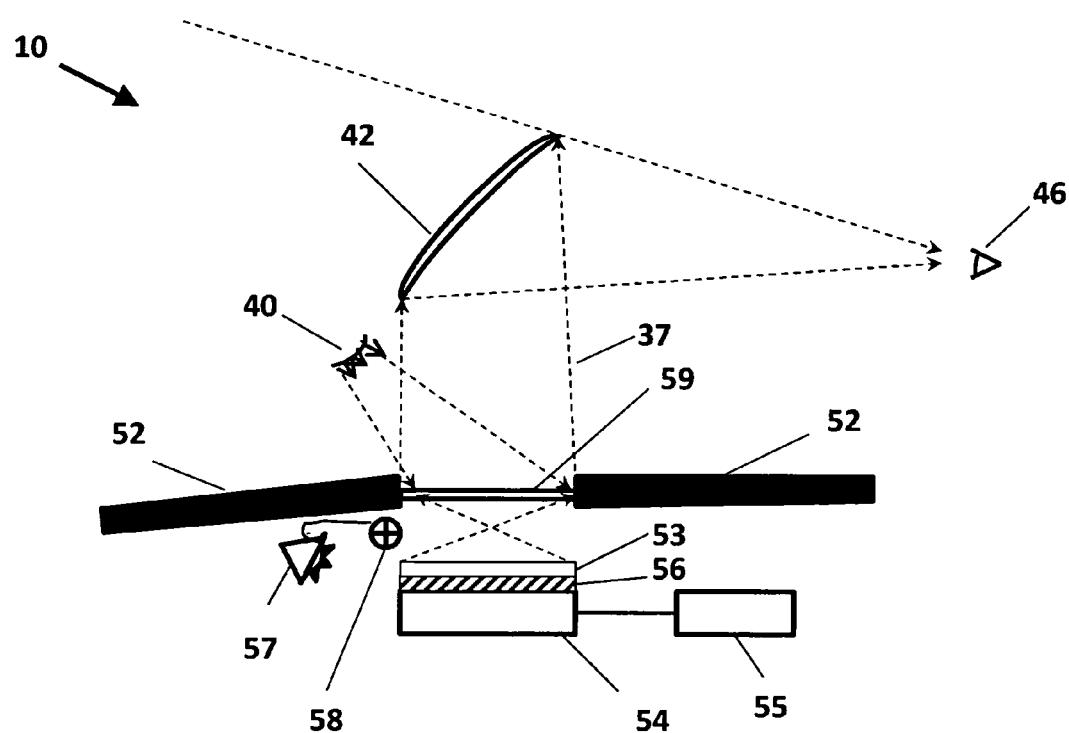
FIG. 3 is a system block diagram showing the components that comprise a reflective head-up display (RHUD).
Figure 5:
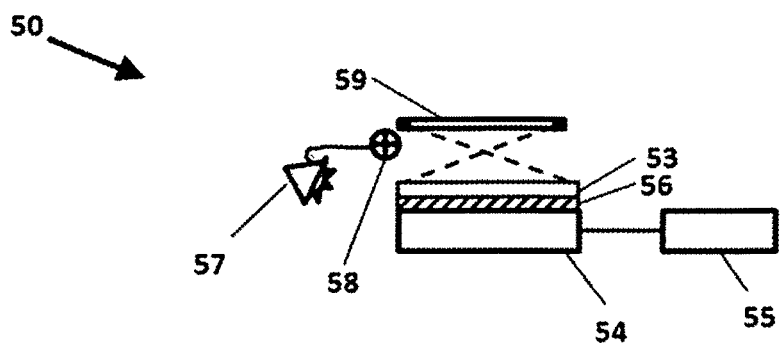
FIG. 5 is a block diagram of the reflective display array (RDA).

The system 10, as shown in FIG. 3, is comprised of two major elements: an inventive optical device (42), which is also referred to as a JaaZ optical Device™ (JOD), and a reflective display array (RDA) (50), as shown in FIG. 5.

The system disclosed herein typically pertains to reflective head-up display systems, which utilize ambient light (40) (Not part of system 10) as a major light source for creating a desired image. The ambient light shines on a reflective display device (RDD) (54), with or without a light collecting element (LCE) (59) and a polarized directing surface (53). The selected image elements (pixels) are reflected by a reflecting surface (56), generating a sub-image. The sub-image is then combined with outside scenery (22) by the JOD (42), to provide a viewer's eye (46) with the desired image appearing in his or her field of view.

It should be noted that the terms photochromic and photochromatic are interchangeably referenced within this patent application, hereinafter photochromic will be utilized.

There are a few alternatives related to the RDD (54) technology, for example Liquid Cristal on Silicone (LCoS), Reflective LCD, Micro-Mirror Device (MMD), Liquid Crystal Display Super Twisted Nematic (LCD-STN), Electronic Ink (E-Ink), micro-mirror, or e-paper panels. Furthermore, the RDD (54) may be an active matrix pixel array or a direct drive. The major property of the RDD (54) is its capability to reflect a selected element (pixel) with high efficiency, such that it maintains its contrast ratio in any ambient light.

The light collecting element (LCE) (59) technology is comprised of optical elements that are selected from the group consisting of micro prisms, micro lenses, brightness enhancement film (BEF), Dual BEF (DBEF), a combination of micro prisms, and a micro lenses array or films.

A Dual Brightness Enhancement Film (DBEF), which uses multi-layer optical film technology to increase the amount of light available of illuminating a liquid crystal display by recycling light that would normally be absorbed by the rear polarizer of a liquid crystal panel, DBEF is a film prism structure that reflects light to and from said system, thereby increasing the brightness of said system's entire viewing range.

Another embodiment of the invention can use an LCoS reflective display in such a way that the surrounding light passes through a polarized LCE and is reflected back from the LCoS to the JOD (42) and to a viewer's eye (46). Another type of RDD (54) can use a digital light processor (DLP) or a Micro-Mirror Device (MMD) which requires an LCE with an optical system focusing the collected light and projecting it to the DLP or MMD. In such an embodiment the JOD (42) is adapted to integrate with the DLP or MMD.

Since the efficiency of the system is fairly constant, an automatic contrast control is inherent to it. In addition, if a dimmed image is needed, the RDD (54) can be controlled to reduce the intensity of the reflected light that produces the sub-image. In case of a dark environment or low ambient light, a supporting light source can be used to replace the lack of light (57), such as provided by Nichol US2011/0227487 A1. In this prior art, [0644] FIG. 13 specifies a dedicated emitting light source ("frontlight 2821") or [0648] FIG. 17 an emitting LED within thin layers ("frontlight 3613") for a reflective display may be used.

Figure 1:
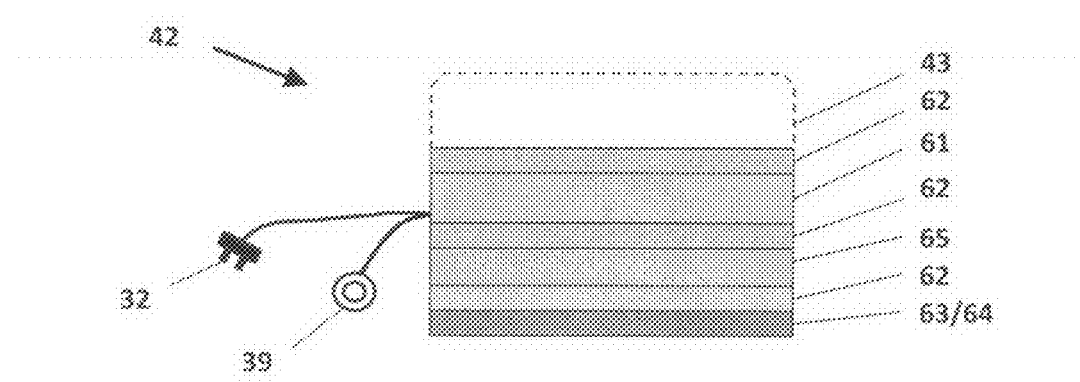
FIG. 1 is across-sectional side view of JOD optical stack.
Figure 2:
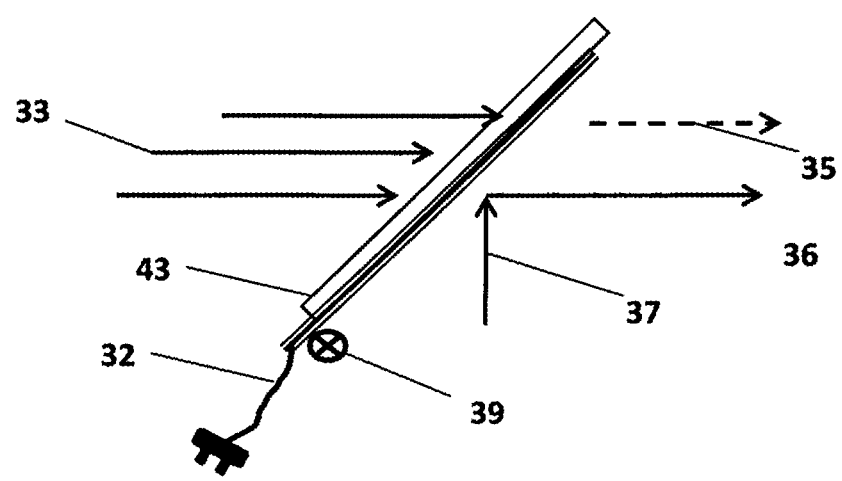
FIG. 2 is a block diagram showing the operation of a JaaZ optical device.

FIG. 1 depicts the cross section of JaaZ Optical Device (JOD) (42) and its optical layers principle structure. FIG. 2 depicts the operation of the JOD (42). Polarized light interfaces with the JOD from a RDD direction (37) and is reflected with high efficiency to direction (36). Normal (non-polarized) light interfaces with the JOD from the opposite side (33) causing the non-polarized transmitted light (35), with less than the polarized light to pass through the same direction as the reflected polarized light (36), and through a light control layer (LCL) (61) in the JOD which senses the brightness of the incidental external light (33), and controls the transparency of the JOD, thus providing automatic dimming of the transmitted light (35).

In another embodiment of the invention, the RHUD optical system (10) can utilize various polarizing orientations and polarities of the light. A proper orientation of the JOD (42) can support the use of "Polaroid" type glasses as they are not oriented horizontally to the viewer.

In yet another embodiment of the invention, the transparency, and its control described herein, can be realized by any light-controlled material. There are a few alternatives to the light sensitive layer technology, for example: photochromic material deposition or film, UV or photon-active like optical power control (OPC) or variable transmittance filter (VTF), or a dynamic sunlight filter (DSF), either deposited in a material or provided as a coating film.

FIG. 1 also provides a more detailed description of the JOD (42) structure as implemented on a windshield or a window (43) substrate. This structure is comprised of layers of optical components such as a polarizing layer (65), anti-reflective layer (AR) (63) and light control layer (LCL) (61). Index matching layers (62) are introduced between the optical components to optimize the optical characteristics of the JOD. When the electrical controlled LCL is used the JOD further comprises a light sensor (39) powered through an electrical interface (32) to provide the LCL with a signal proportional to the intensity of the incident external light (33).

In yet another embodiment of the invention, the transparency, and its photo sensor (39) control described herein, can be realized by any electrical light-controlled material. There are a few alternatives related to electric light control layer (61) technology: for example electrochromic material, dichroic material, Suspended Particle Device (SPD), E-TINT® deposition or film. Another embodiment of the transparency control utilizes the reflective polarizing layer (65) within the JOD against an electrically controlled polarizer layer, twisted polarization is utilized to control the external incidental light (33).

FIG. 3 shows the system structure and the main components of the RHUD which comprises an optical system that has two major light paths. The first path collects the ambient light (40) (Not part of system 10) to be used as a source light. The source light is directed to a reflective surface (56) where the image is created and reflected. The second light path combines most of the display reflected light (47) in the direction (37) towards the JOD (42) from which it is combined with a selective portion of the outside scenery (22), without the need for either an optical relay nor an additional powered optical element, and displayed as an image combined with the outside scenery, while maintaining the combined contrast ratio.

The RHUD comprises the following components:

1. The reflective display device (RDD) (54) that displays the desired information, such as a picture, computer data, etc.

2. A reflective surface (56) that uses ambient light (40) to project the desired (displayed) information in a desired direction.

3. The light collecting element (LCE) (59) which collects and direct the ambient light to the RDD (54) reflective surface (56).

4. A display processor that utilizes control electronics (55) to create an image and provides it to the RDD (54).

5. The JaaZ optical device (JOD) (42).

6. Means for controlling the JOD (42) transparency and the RDD (54) lighting control signals based on the ambient light (40) and incident light level (33). An anti-reflective layer (63) or a protection layer can be applied at a desired reflective surface of the JOD.

7. Light sensors (58) that provide light level information are used as a supporting light source (57) of the RDD (54). The supporting light source (57) of the RDD (54) is installed on the side of the RDD.

8. Means for adjusting the generated image or the reflective surface (56) so it appears within the viewer's field of view.

9. The light collecting element (LCE) (59) are used to collect the ambient light (40) on the reflective surface (56).

Polarized light coming from one direction (37) is selectively reflected, such as the light that is reflected from the RDD's (54) polarized component.

The light coming from other directions is electrically or optically controlled by the JOD (42) while passing through the JOD (42) and is combined with the reflected polarized component (36) of the RDD (54).

The JOD (42) can use its electrical input to be controlled by a JOD light sensor (39), such that the JOD (42) transparency is automatically adjusted. Additionally, the JOD transparency can be controlled by an internal material, such as Photochromic, an Optical Power Control (OPC) or a Dynamic Sunlight Filter (DSF) or Variable Transmittance Filter (VTF) type compound within the JOD (42).

Figure 4:
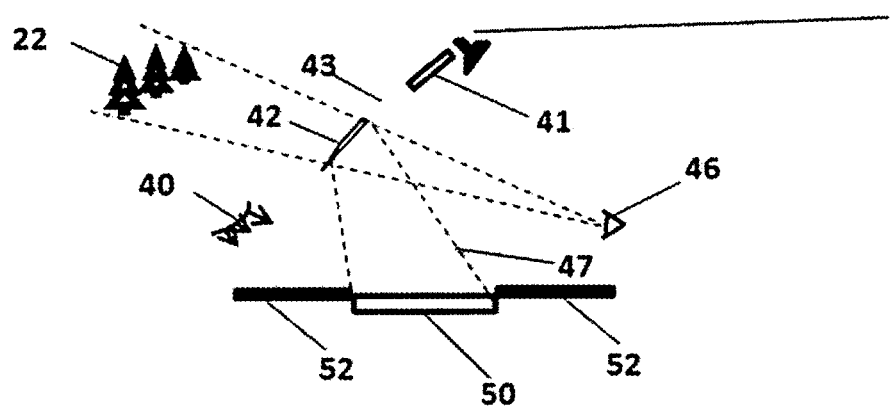
FIG. 4 is a system block diagram showing the relative placement of the components that comprise the reflective head up display.

The JOD (42) can be embedded within or bonded to a vehicle windshield (43) such that it is used as an automatic visor, as shown in FIG. 4. In one realization of the JOD (42), its edges can be faded and provide smooth optical transition to the clear windshield or window (43). Additionally, the RDA (50) can be embedded within a vehicle dashboard (52), as shown in FIG. 4.

In another embodiment, the JOD (42) has an index matching material (62) for matching light refraction indexes within the internal layers, thus increasing the efficiency of the system and eliminating undesired reflections or ghosts. Also, the JOD (42) has a touch screen layer (64) connected to the system control electronics (55) supporting a user interface.

In another embodiment of this invention, one or more of the light collecting elements (59) can be a DBEF, which is a thin film prism structure that reflects light back and forth to the RDD, thus increasing the brightness over the entire RDD viewing range. The RDD (54) can be replaced by a projection display device in which the supporting light source (57) is used as a light source to project the (displayed) information through the reflective surface (56) in the desired direction.

In another embodiment of the invention the polarization direction of the RDD (54) is in line with the JOD (42) for the highest reflected light efficiency.

The RHUD is comprised of: the RDD (54) generating the required display image, the LCE (59) and an optical mixer element—the JOD (42). The reflective display (54) is able to reflect the desired generated image with or without the use of polarized light. Additionally, the RHUD can combine an audio system that provides associated information in an audible form.

The RDD (54) may include a light collector (59) that acquires the surrounding light in such a manner that the majority of desired light energy is reflected from the display element towards the JOD (42).

The RDD (54) reflects with high efficiency the display light properties while allowing most of the scenery light (22) to pass through in such a way that a combined image is seen by the observer/driver (46). In some occasions, when the outside scenery (22) is too bright, an embedded property within the JOD (optically or electrically) varies the transparency of the JOD.

The dual brightness enhancement film is a reflective device that uses a multi-layer optical film technology to increase the amount of light available for illuminating the aforementioned reflective surface display by recycling light that would be otherwise absorbed by the system. As a result, the lighting efficiency is increased while the image viewing angle is maintained. By providing control power manually or by using a light sensor, the transparency of the JOD (42) can be electrically adjusted based on the intensity of the light at a driver's field of view.

The RDD (54) display processor (55) comprises means for selecting a source of data for the displayed image, preparing and orienting the image and compensating for inherent windshield distortion prior to displaying the image.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A system for producing a display image on a transparent or semi-transparent illuminated surface utilizing external ambient light, wherein said system is comprised of:
   a) a polarizing reflective surface that utilizes external ambient light to project said display image in a selectable direction, and
   b) at least one light collecting element that collects and directs said external ambient light to said polarizing reflective surface, and
   c) a display processor for creating said display image, and
   d) an optical device that accepts light from multiple directions, wherein said optical device selectively reflects polarized light orienting from first direction of the said polarizing reflective surface, and transmits through light orienting from a second direction of outside scenery while controlling the optical properties of the light orienting from the second direction, and
   wherein said display image of said polarizing reflective surface is projected in said selectable direction such that the orientation of said polarized reflective image is aligned with the orientation of said selectively reflected polarized light orienting from first direction of said optical device that accepts light from multiple directions, and wherein said projected display image of said polarizing reflective surface is utilizing said external ambient light by using said light collecting element in front of said polarizing reflective surface thus eliminating the need for any light illuminated from the back side of the display ("Backlight"), and wherein said optical device that accepts light from multiple directions controls the optical characteristics of said light orienting from a second direction of outside scenery and combines this light with said polarized light orienting from first direction of the said polarizing reflective surface to create a combined image.

2. The system as specified in claim 1 wherein said transparent or semi-transparent surface is selected from the group consisting of a vehicle windshield or a window type surface.

3. The system as specified in claim 1 wherein display processor said comprises means for selecting a source of data for the displayed image, preparing and orienting the image and compensating for inherent windshield distortion prior to displaying the image.

4. The system as specified in claim 1 wherein said light collecting element is comprised of optical elements that are selected from the group consisting of micro prisms, micro lenses, brightness enhancement film (BEF), or a combination of the said optical elements.

5. The system as specified in claim 1 wherein said polarizing reflective surface is selected from the group consisting of a liquid crystal on silicone (LCoS), reflective LCD, or liquid crystal display super twisted nematic (LCD-STN).

6. The system as specified in claim 1 wherein said optical device that reflects polarized light is comprised of a wire-grid type or a polarizing-coating type.

7. The system as specified in claim 1 wherein optical device is comprised of a light controlling layer that controls the optical characteristics of said optical device based on the amount of said optical device's light orienting from the second direction wherein the properties of the second direction light are selected from the group consisting of photo-active layer, Photochromic, an Optical Power Control (OPC), a dynamic sunlight filter (DSF) or Variable Transmittance Filter (VTF) type.

8. The system as specified in claim 1 wherein optical device is comprised of electrical light controlling layer that controls the optical characteristics of said optical device based on the amount of electrical power representing said optical device's light orienting from the said second direction wherein the second direction light is controlled by means selected from the group consisting of electro-active layer, Suspended Particle Device (SPD), E-TINT,® electro-active polarizing layer, Electrochromic or dichroic filter type.

9. The system as specified in claim 8 wherein said light controlling layer that controls the optical characteristics of said optical device is a fixed filter.

10. The system as specified in claim 1 wherein said optical device further comprises a touch-screen for controlling said display processor.

11. The system as specified in claim 1 wherein said optical device further comprises an elements that are selected from the group consisting of a protective coating, an Anti-Reflective (AR) surface that is directed towards the transparent or semi-transparent surface, an index matching material that correlates light refraction indexes within said optical device, thereby increasing the efficiency of said system and eliminating undesired reflections.

12. The system as specified in claim 1 wherein said reflective surface further comprises mechanical means for adjusting the desired direction such that said display image clearly appears within the viewer's field of view.

13. A system for producing a display image on a transparent or semi-transparent illuminated surface utilizing external ambient light, wherein said system is comprised of:
   a) a reflective surface that utilizes external ambient light to project the display image in a selectable direction, and
   b) at least one light collecting element that collects and directs external ambient light to said reflective surface, and
   c) a display processor for creating said display image and transmitting said display image onto said system, and
   d) an optical device that accepts light from multiple directions, wherein said optical device selectively reflects light orienting from first direction of the said reflective surface, and transmits through light orienting from a second direction of outside scenery while controlling the optical properties of the light orienting from said second direction, and wherein said display image of said reflective surface is projected in said selectable direction such that the orientation of said reflective image is aligned with the orientation of said selectively reflected light orienting from first direction of said optical device that accepts light from multiple directions, and wherein said projected display image of said reflective surface is utilizing said external ambient light by using said light collecting element in front of said reflective surface thus eliminating the need for any light illuminated from the back side of the display ("Backlight"), and wherein said optical device that accepts light from multiple directions controls the optical characteristics of said light orienting from a second direction of outside scenery and combines this light with said light orienting from first direction of the said reflective surface to create a combined image.

14. The system as specified in claim 13 wherein said transparent or semi-transparent surface comprises a vehicle windshield or a window type surface.

15. The system as specified in claim 13 wherein said display processor comprises means for selecting a source of data for the displayed image, preparing the image and compensating for inherent windshield distortion prior to displaying the image.

16. The system as specified in claim 13 wherein said at least one light collecting element is comprised of optical elements that are selected from the group consisting of micro prisms, micro lenses, Brightness Enhancement Film (BEF), or a combination of the said optical elements.

17. The system as specified in claim 13 wherein said reflective surface comprises an E-ink, e-paper, Micro-Mirror Device (MMD) or Digital Light Processor (DLP) type display.

18. The system as specified in claim 13 wherein said reflective surface is a polarizing reflective surface selected from the group consisting of a liquid crystal on silicone (LCoS), reflective LCD, or liquid crystal display super twisted nematic (LCD-STN).

19. The system as specified in claim 13 wherein optical device is comprised of a light controlling layer that controls the optical characteristics of said optical device based on the amount of said optical device's light orienting from the second direction wherein the properties of the second direction light are selected from the group consisting of photo-active layer, Photochromic, an Optical Power Control (OPC) or a Dynamic Sunlight Filter (DSF) or Variable Transmittance Filter (VTF) type.

20. The system as specified in claim 13 wherein said optical device is comprised of a electrical light controlling layer that controls the optical characteristics of said optical device, wherein said control is based on the amount of electrical power representing said optical device's light orienting from the said second direction, wherein the second direction light is controlled by means selected from the group consisting of electro-active layer, Suspended Particle Device (SPD), E-TINT®, electro-active polarizing layer, Electrochromic or dichroic filter type.

21. The system as specified in claim 20 wherein said light controlling layer that controls the optical characteristics of said optical device is comprised of a fixed filter.

22. The system as specified in claim 13 wherein said optical device further comprises a touch-screen for controlling said display processor.

23. The system as specified in claim 13 wherein said optical device further comprises elements that are selected from the group consisting of a protective coating, an Anti-Reflective (AR) surface that is directed towards the transparent or semi-transparent surface, and an index matching material that correlates light refraction indexes within said optical device, thereby increasing the efficiency of said system and eliminating undesired reflections.

24. The system as specified in claim 13 wherein said reflective surface further comprises mechanical means for adjusting the desired direction such that said display image clearly appears within the viewer's field of view.

* * * * *